No. 736,096. PATENTED AUG. 11, 1903.
C. J. A. HEISE.
APPARATUS FOR TESTING THE BALANCE OF WHEELS.
APPLICATION FILED OCT. 19, 1900.
NO MODEL.
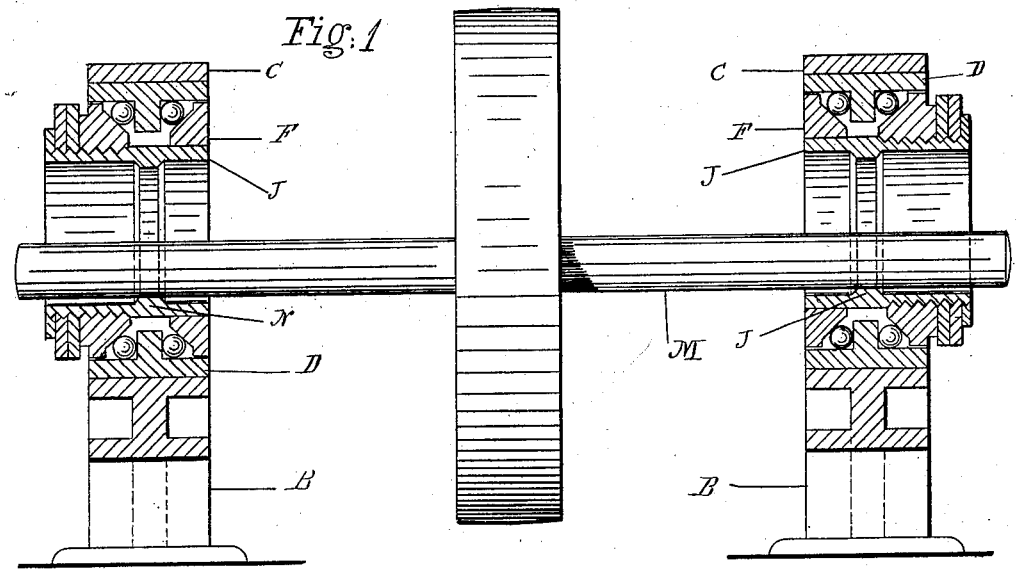
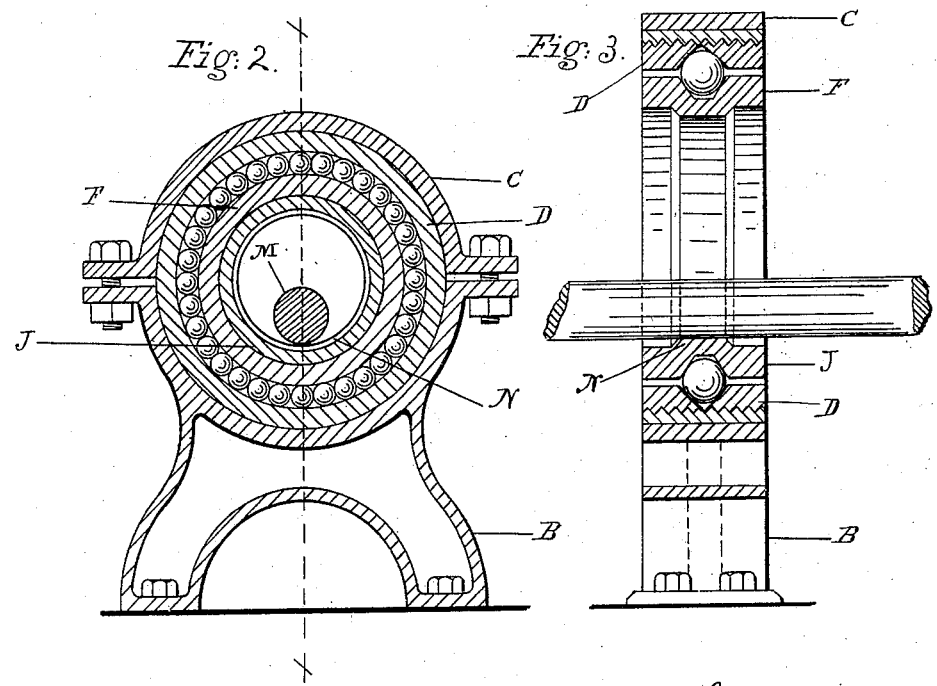

No. 736,096. Patented August 11, 1903.

UNITED STATES PATENT OFFICE.

CHARLES J. A. HEISE, OF NEWARK, NEW JERSEY.

APPARATUS FOR TESTING THE BALANCE OF WHEELS.

SPECIFICATION forming part of Letters Patent No. 736,096, dated August 11, 1903.

Application filed October 19, 1900. Serial No. 33,562. (No model.)

*To all whom it may concern:*

Be it known that I, CHARLES J. A. HEISE, a citizen of the United States, and a resident of Newark, in the county of Essex and State of New Jersey, have invented certain new and useful Improvements in Apparatus for Testing the Balance of Wheels, of which the following is a specification.

The objects of my invention are, first, to provide effective and convenient means whereby the balance of pulleys and wheels may be quickly and accurately determined; second, to provide suitable mechanism adapted to test the balance of pulleys and wheels which shall require no previous adjustment or alinement nor a necessity that the two points of bearing of the testing-shaft on the interior surface of the loose rings be adjusted in alinement in the same parallel plane horizontally or vertically. These objects are attained by the mechanism illustrated in the accompanying drawings, in which—

Figure 1 represents a sectional elevation showing a testing-shaft and pulley thereon in position to test its balance. Fig. 2 is a perpendicular central cross-section of a suitable ball-bearing, showing the relative locations of the axes of the loose rings and bearings and the axis of the testing-shaft. Fig. 3 represents a perpendicular longitudinal section of a ball-bearing having a single row of friction-balls, the testing-shaft being in elevation.

Similar letters refer to corresponding parts throughout the several views.

The standards of this testing mechanism are of the form of ordinary standards employed in ball-bearings, consisting of a fixed base B and an adjustable upper half or cap C, by means of which the outer rings D of the bearings may be firmly clamped and confined permanently in a fixed position therein. These rings D, together with revolving loose rings F, are channeled or grooved in the usual manner to receive the friction-balls, as shown, the balls being introduced into the channel by turning the standard to a horizontal position and raising the exterior part of the channeled bearing sufficiently to admit the balls in the usual manner.

Secured to the loose rings F are the inner or shaft-supporting rings J, upon the inner surfaces of which the ends of the shaft of the pulley or wheel to be tested rest centrally in a perpendicular plane with the axes of the loose rings F and ball-bearings, the center N thereof forming a narrow surface upon which the ends of the testing-shaft M rest and revolve.

It will be observed that the inner loose rings J are of sufficient dimensions to admit the ends of the shaft M of the pulleys or wheels to be tested thereon eccentric to the axes of the ball-bearings and loose rings, so that in determining the point of overbalance the loose rings J, ball-bearings, and testing-shaft M may revolve independently upon their respective axes in a vertical plane passing centrally therethrough, as indicated by broken lines, Fig. 2.

In Fig. 3 one row only of friction-balls is employed; otherwise the construction and operation thereof are similar to that of Fig. 1. It will also be observed that by employing two separate and independent stands, ball-bearings, and rings thereon upon which the ends of the testing-shaft M rest, respectively, the axes of the ball-bearings and the axis of the testing-shaft being eccentric to each other in a vertical plane passing therethrough, no adjustment or alinement of the bearings is required preparatory to testing the balance of pulleys and wheels.

Having described my improvements in mechanism adapted to be employed in testing the balance of pulleys and wheels, what I claim therein as new, and desire to secure by Letters Patent, is—

In a device for testing the balance of wheels, the combination of separate standards each providing outer and inner annular portions, the latter having at its inner surface a narrow annular rib, balls between the inner and outer annular portions of each standard, retaining-cones screwed into place between said annular portions to confine said balls, and a testing-shaft having ends of smaller diameter than the central openings of the inner annular portions of the standards and arranged therein, said ends being loose both to rotate and to change position.

Signed at Newark, in the county of Essex and State of New Jersey, this 30th day of August, A. D. 1900.

CHAS. J. A. HEISE.

Witnesses:
 WALTER WALKER,
 WILLIAM HEISE.